United States Patent
Hasegawa et al.

(10) Patent No.: US 11,701,591 B2
(45) Date of Patent: Jul. 18, 2023

(54) TEAM PLAYING TYPE GAME PROGRAM

(71) Applicant: SQUARE ENIX CO., LTD., Tokyo (JP)

(72) Inventors: Tomohiro Hasegawa, Tokyo (JP); Yusuke Ikeda, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 0 days.

(21) Appl. No.: 17/546,424

(22) Filed: Dec. 9, 2021

(65) Prior Publication Data

US 2022/0184504 A1     Jun. 16, 2022

(30) Foreign Application Priority Data

Dec. 10, 2020   (JP) ................................. 2020-204917

(51) Int. Cl.
*A63F 13/24*     (2014.01)
*A63F 13/798*    (2014.01)
*A63F 13/822*    (2014.01)
*A63F 13/847*    (2014.01)
*A63F 13/795*    (2014.01)

(52) U.S. Cl.
CPC .......... *A63F 13/798* (2014.09); *A63F 13/795* (2014.09); *A63F 13/822* (2014.09); *A63F 13/847* (2014.09)

(58) Field of Classification Search
CPC .... A63F 13/798; A63F 13/795; A63F 13/822; A63F 13/847
See application file for complete search history.

(56) References Cited

U.S. PATENT DOCUMENTS

| | | | | |
|---|---|---|---|---|
| 8,287,378 B2* | 10/2012 | Ogawa | ................... | A63F 13/86 463/40 |
| 2011/0124417 A1* | 5/2011 | Baynes | ................. | A63F 13/798 463/43 |
| 2014/0094317 A1* | 4/2014 | Takagi | .................... | A63F 13/35 463/42 |
| 2014/0302923 A1* | 10/2014 | Sato | ........................ | A63F 13/44 463/31 |
| 2018/0264366 A1* | 9/2018 | Kawahara | ............. | A63F 13/798 |
| 2021/0060438 A1* | 3/2021 | Oe | ........................ | A63F 13/847 |

* cited by examiner

*Primary Examiner* — David L Lewis
*Assistant Examiner* — Shauna-Kay Hall
(74) *Attorney, Agent, or Firm* — Greenblum & Bernstein, P.L.C.

(57) ABSTRACT

A game is provided in which playing characters controlled by players battle each other in a three dimensional virtual space so as to obtain battle points. The obtained battle points are collected as total values, with the total values being ranked. A player belongs to one group of a plurality of groups set in the game program. The playing characters are divided into specific teams based on input from each player, with each specific team being in the group to which the player belongs. The teams, including two or more playing characters comprising the team, of different groups battle in the three dimensional virtual space. The battle points obtained by the respective playing characters in the battle are totalized for every team, and the teams are ranked based on the team points.

4 Claims, 7 Drawing Sheets

|  | GROUP 1 | GROUP 2 | | GROUP N |
|---|---|---|---|---|
| TEAM A | 241 | 95 | | 301 |
| TEAM B | 485 | 321 | | 82 |
| TEAM C | 651 | 213 | | 289 |
| TEAM J | 101 | 45 | | 358 |
| Total | 2951 | 1962 | | 2546 |

TEAM PLAYING TYPE GAME PROGRAM

CROSS REFERENCE TO RELATED APPLICATION

The present disclosure relates to subject matter contained in Japanese patent application No. 2020-204917 filed on Dec. 10, 2020, the disclosure of which is expressly incorporated herein by reference in its entirety.

TECHNICAL FIELD

This invention relates to a team playing type game program wherein respective playing characters belonging to respective teams battle each other in team competition in a battle space set in a three-dimensional virtual space.

BACKGROUND ART

A team playing type game is known, and such a game is that in a battle space set in the three dimensional virtual space in a memory in a server, a predetermined number of players comprise a group, such as a clan and a guild, a playing character of the player of each group competes against the playing character of another player belonging to another group with one to one (due to an event, such as a competition or the competition in a normal battle), and the results (battle results) are totalized every group in order to compete for ranking of the groups.

SUMMARY OF INVENTION

Problems to be Solved by Invention

In such a game program, the ranking of the group becomes a simple total of the battle results for the playing characters of the respective players comprising the group. In the end, strategy or tactics as the group may not be effective, so that interest on the game may be damaged.

An object of the invention is to provide such a new team playing type game program that the whole battle results of the group comprising the player characters of two or more players are affected by the combination of the playing characters of two or more players comprising the group.

Means for Solving Problems

A first aspect of the invention is a team playing type game program for getting a computer (2) to execute such a routine that playing characters (PC) respectively controlled by many players battle each other in a three dimensional virtual space so as to obtain battle points, the obtained battle points are collected as total values, and the total values are ranked, the playing character (PC) belonging to one of two or more groups in a game world of the three dimensional virtual space, each group of two or more groups being divided into two or more teams, the program for getting the computer to execute the following routines:

- a team division routine of dividing the playing characters (PC) respectively controlled by many players into specific teams based on input from the players, each specific team being in the group belonging to the playing character (PC);
- a storing routine of storing team data showing to which team each playing character belongs together with the belonging group in a memory;
- a battle routine of battling for every team, between two or more playing characters(PC) comprising the team, between the teams of the different groups;
- a point totalizing routine of real-timely totalizing the battle point obtained by the respective playing characters when executing the battle routine for every team belonging to each playing character, and storing the battle point as a team point (TP) in the memory;
- a group ranking routine of totalizing the team points every team obtained through the point totalizing routine for every group for a predetermined period, the team points being obtained for all teams belonging to the respective groups, and storing the results in the memory, respectively giving a ranking for each group; and
- a ranking output routine of outputting the ranking for every group.

A second aspect of the invention is the team playing type game program, wherein the program gets the computer to further execute a routine of changing the team belonging to the playing character (PC) of the player and leaving the team belonging to the playing character according to a team change instruction inputted through the player at an optional time through the terminal (5) the player operates.

A third aspect of the invention is the team playing type game program, wherein the battle routine further comprising a routine where the battle starts when locating objects of the playing characters (PC) comprising the teams of the different groups in the battle space (BF) set in the three dimensional virtual space at predetermine battle start positions.

A fourth aspect of the invention is the team playing type game program, wherein the teams that participate in the battle in the battle routine are two or more teams for each group.

Effects of Invention

According to the invention, the playing character of each player is entered into a specific team within the group to which such a playing character belongs, and a battle is executed every team, between the two or more playing characters comprising the team, between the teams of the different groups. At the result, the battle points obtained by the respective playing characters (PC) are totalized as the team point (TP) every team to which the playing character (PC) belong, and the battle points are totalized for every group for a predetermined period for all teams belonging to the respective groups, and the totalized results are ranked for every group. Then, an important point is how each group comprising the respective teams can obtain the team point (TP), rather than strength of each playing character, so that the higher strategy and a close cooperation between the players are necessary and the interests on the game is widely improved thereby.

In addition, the player is able to change the team to which the playing character (PC) of the player belongs and to leave such a team at an optional point of time. Then, it is possible to flexibly form the respective teams, and for this reason, it is possible to reflect the player's intensions and preference to a planning and an operation of the strategy as the team and the group.

And, when the battle starts, the objects of the playing characters (PC) comprising the teams of different groups are located at the predetermined battle start positions. Then, the battle start state is set in advance in the game program, it is possible to locate the respective playing characters in a shorter time rather than a case where each player locates his/her ownplaying character. In addition, it is possible to prevent an improperly unbalanced location of the playing characters (PC) in the battle space (BF).

Furthermore, each group is comprised of two or more teams that participate in the battle in the battle routine, so that it is easy for the player to attack against the opponents in cooperation with the teams, watching the display of his/her own terminal (5), and it is possible to provide a game having higher strategic characteristics.

PREFERRED EMBODIMENT

In the following embodiments, specific detail matters are mentioned in order to deeply understand the invention, and the embodiments in the invention are not limited to such specific detail matters. In addition, well-known matters are not mentioned in detail in order to avoid unnecessary complicated descriptions.

Figure 1:
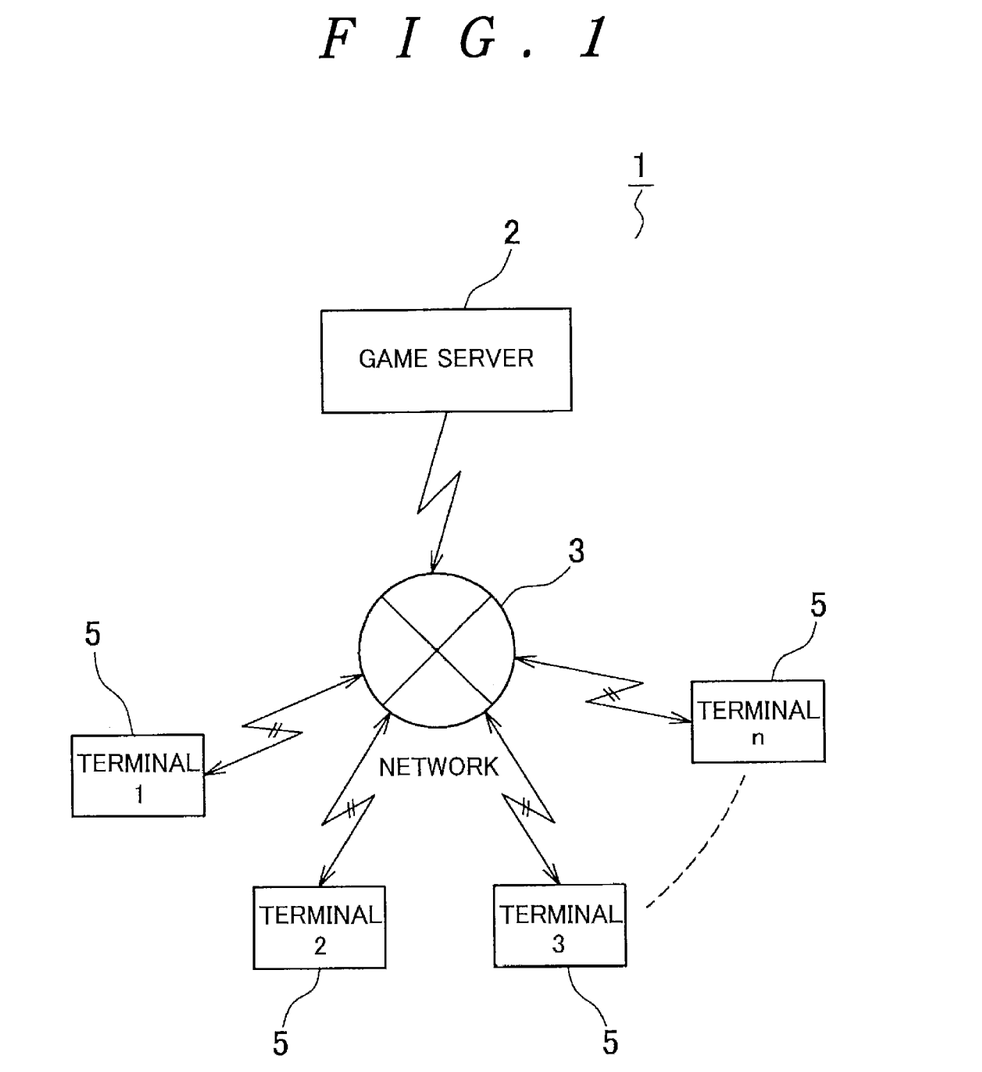
FIG. 1 is a block diagram that shows an instance of a game system to which the invention is applied.

As shown in FIG. 1, a game system 1 to which the invention is applied has a game server 2, and many terminals 5 are connected with the game server 2 through a communication network 3, such as the Internet. The terminal 5 are respectively shown as "terminal 1", "terminal 2", "terminal 3", . . . "terminal n" in order to differentiate one from another, but it is called simply the terminal 5 when not distinguishing each terminal.

Besides, each terminal 5 may have any structure as long as it is possible to connect a game server with the terminal 5, such as a stationary terminal dedicated for games, a portable game terminal, a smartphone and a tablet and another portable general terminals, and a personal computer, so as to control to locate a playing character of a player who operates each terminal 5 in a battle space that is a three dimensional virtual space formed in a memory of the game server 2 and to remove such a playing character from such a space.

Figure 2:
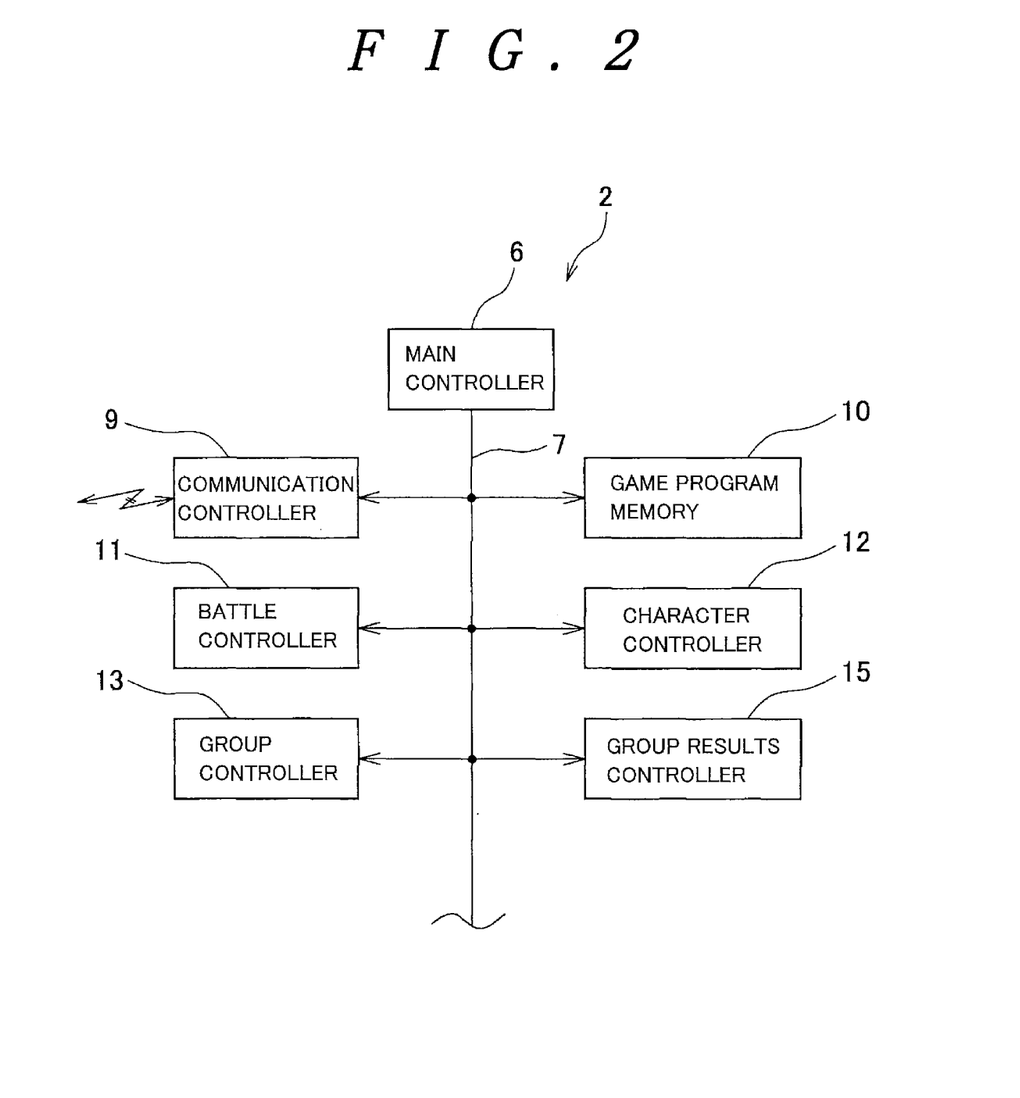
FIG. 2 is a block diagram that shows an instance of a game server.

As shown in FIG. 2, the game server 2 has a main controller 6, and a communication controller 9 to be connected with the network 3, a game program memory 10, a battle controller 11, a character controller 12, a group controller 13 and a group result controller 15 are connected with the main controller 6 through a bus line 7.

The main controller 6, the communication controller 9, the game program memory 10, the battle controller 11, the character controller 12, the group controller 13 and the group result controller 15 which comprises the game server 2 as shown in FIG. 2 are typically shown in order to easily understand the invention, and in fact, these function as a computer which are comprised of a CPU, a memory, various control programs and the like.

The game server 2 executes apart of a game program that is mentioned hereinafter, so that the CPU of the computer that comprises the game server 2 time-dividedly functions as respective function blocks of FIG. 2 comprising each game server 2, but the game server 2 may be configured such that the respective function blocks in FIG. 2 may be dedicated hardware and/or software.

The game system 1 has the above-mentioned structure. A game through the game system 1 is executed in such a manner that plural players log in the game server 2 through the operation of the respective terminals 5, each player controls to move his/her playing character in the battle space in the three-dimensional virtual space that is formed in a memory of the battle controller 11 of the game server 2, and the playing character of the player battles an enemy playing character to be operated by another player (or non-playing character controlled by the game program) that is similarly located in the battle space.

Such a game to let the playing character associated with each player compete against the enemy character in the battle space, the three dimensional virtual space of the server 2 through many terminals 5 is well known. So, the following explanation is on the assumption that object data and its attribute data for the playing character associated with each player are already stored in a memory in the character controller 12 of the server 2 in addition to various battle ability data (data necessary for the battle with the enemy character in the battle space, such as HP, MP, arms and items), and the playing character associated with each player is able to freely take actions in the battle space according to instructions from each terminal 5 of the player via the game program stored in the game program memory 10. It is similar concerning the non-playing character that can compete against the playing character in the battle space. The battle is between the playing character PC and the non-playing character that is the enemy character, but the game program may set such an event that the playing characters PC compete against each other, and groups (such as guilds and clans) belonging to the respective players contend each other for superiority of battle results.

When the player usually plays a game with the battle actions in the battle space in the game server 2 according to the game program, each player logs in the server 2 via the network 3 through the operation of his/her own terminal 5. Log-in information of each player is processed by the communication controller 9, and the character controller reads the data of the playing character of the player who logged in out of the memory (not shown) and outputs it to the battle controller 11. The battle controller 11 locates the playing character(s) of one or more players who logged in on predetermined location position(s) of the battle space in the three dimensional virtual space in a predetermined timing according to the game program, and the battle starts.

The following explanation relates to the event mentioned before where the playing characters PC compete against each other, and groups (such as guilds and clans) of the respective players contend each other for superiority of battle results. Such an event is combined in a part of a game scenario according to the game program, or each player is able to optionally participate in such an event. The event where the playing characters PC compete against each other, and groups (such as guilds and clans) of the respective players contend each other for superiority of battle results is referred to as only "team competition", and the team competition is controlled according to a team competition control program TBC that is a part of the game program.

Figure 7:
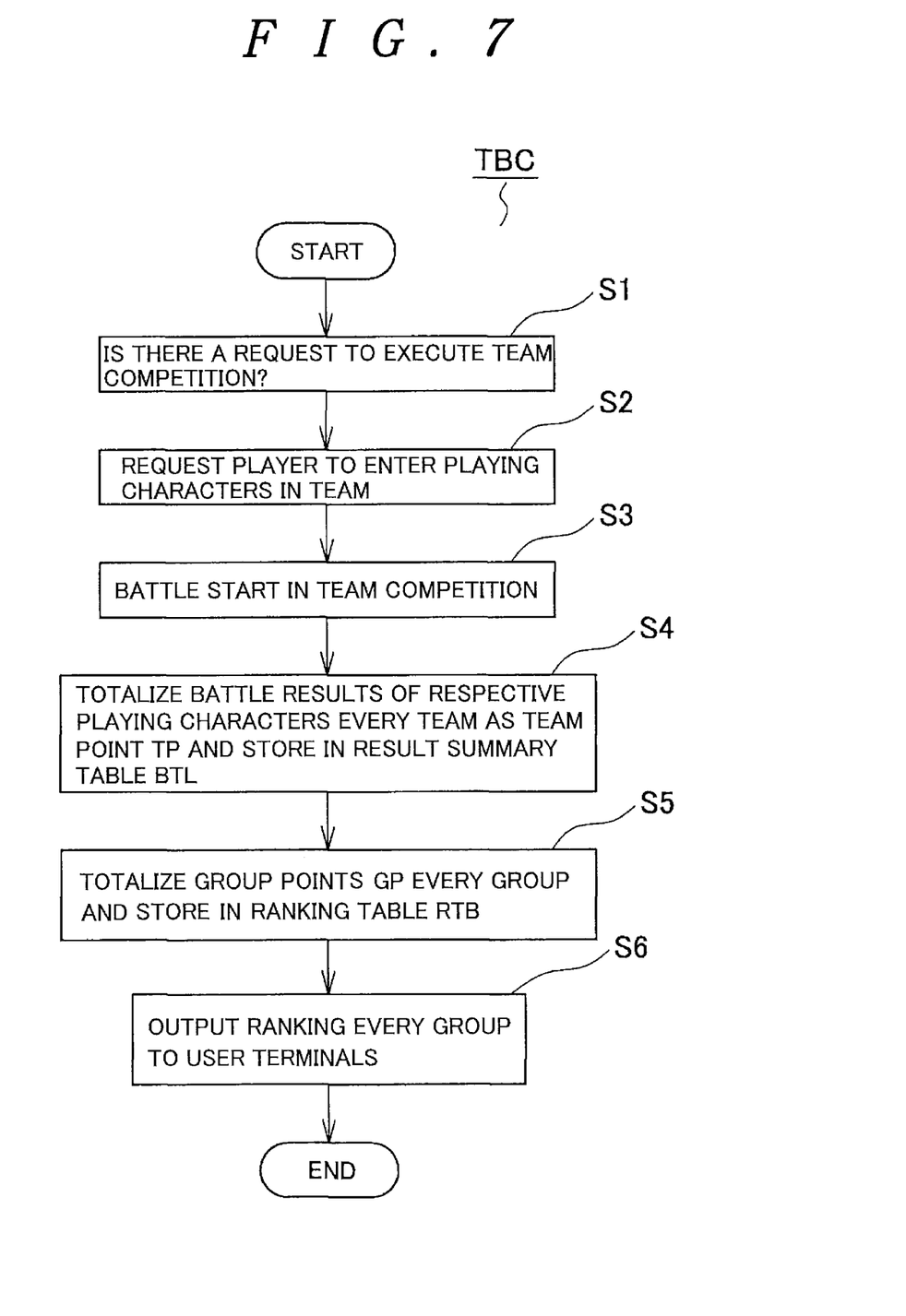
FIG. 7 is a flowchart that shows an instance of a team competition control program.

The team competition control program TBC enters Step S1 in FIG. 7 at the time of executing the team competition, and judges whether the player requests to execute such a team competition, or the battle controller 11 provides such a request on the game scenario that is controlled according to the game program. The request to execute the team competition is based on the request from each player via the terminal 5, or is provided according to the game program when each playing character takes predetermined actions in the three dimensional virtual space.

When the request to execute the team competition is given, the team competition control program TBC enters Step S2, and requests each player who outputs the request to execute the team competition or each player associated with the proceedings of the scenario to place the playing character on one of two or more teams of the group belonging to each player. The battle controller 11 gives such a request to the terminal 5 which each player operates through the communication controller 9 and the network 3.

Figure 3:
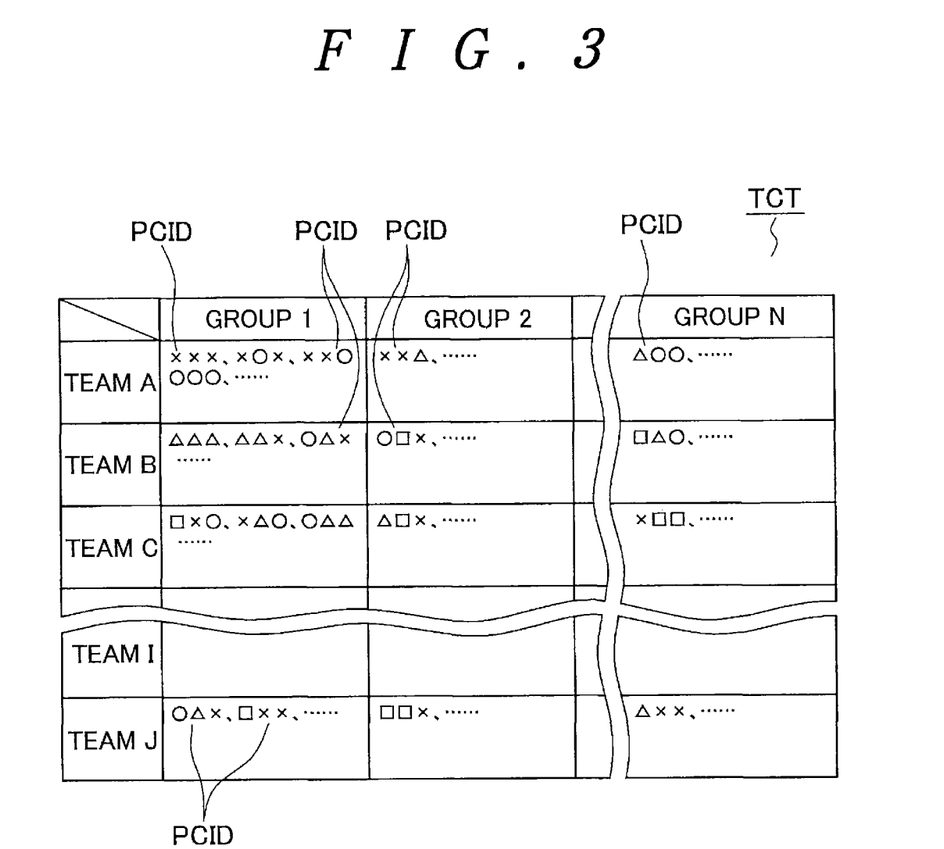
FIG. 3 is a view that shows an instance of a team forming table that shows a structure of teams in each group.

In a game world in the three dimensional virtual space where the battle controller 11 controls the game advancing according to the game program, the playing character operated by the player is requested to take actions in the virtual space, belonging to any group, such as the guild and the clan. If the player has not an existing group where the player wants to belong to, the game program allows the player to arrange a new group. Such a system is well known, and in a case of the team competition, the battle controller 11 sets such a category that each group is classified into two or more teams, such as Team A, Team B, Team C, . . . . . . Team J as shown in FIG. 3, according to the game program, and requests each player to execute the team competition so that the playing character of the player in each group belongs to a proper team (Step S2). After assigning a predetermined number of the playing characters to the respective teams and the start of the team competition gets ready, the program enters Step S3.

In response to the request of team classification from the battle controller 11, each player talks with another players in the same group about to which teams the playing characters of the respective players belong, using chat features in the game, and determine this, and informs the determined to the battle controller 11 of the server 2 from each terminal 5. The players comprising the group classify the playing characters in the teams according to characteristics of the playing characters of the players, for instance, according to levels, HP, MP, arms, magic, good skills of the playing characters, in order to oppose expected enemy playing characters. That is, the team competition is set by the game program so that the respective teams of the group can compete against each other in the team competition. For this reason, it is possible to collect the playing characters who are strong in magic, or collect the playing characters who are strong in physical attacks, in the specific team in the group so as to increase the interest of the game.

At the result, for the respective teams that are set for two or more groups participating in the game, such as Group 1, Group 2, Group 3 . . . Group N, as shown in FIG. 3, the respective playing characters PC are divided into the respective teams TM within the group to which the players belong, through the input from many players who wish to participate in the team competition through the terminals 5. Contents of the teams divided are stored in a memory (not shown) in the group controller 13 as a team configuration table TCT as shown in FIG. 3 according to the instruction from the battle controller 11 based on the game program. In the team configuration table TCT, the playing character PC belonging to each team of each group is stored by each identification mark PCID. Team capacity may be set, such as ten characters per team, or may be set as minimum capacity. In addition, the number of the playing characters comprising each team may be set in a predetermined range so as to increase or decrease the number according to the strategy of each group, or the number of the playing characters of each team may be predetermined. The team competition control program TBC has an interruption routine according to the team changing instruction inputted at an optional time through the terminal 5 that the player operates, such as the routine where the player changes the team to which the playing character of the player belong or the playing character leaves from his/her own team. Such a routine is controlled to be executed through the group controller 13.

After dividing the playing characters of the players of each group who participate in the team competition in the respective teams within the group, the battle controller 11 starts the team competition in a battle space BF within the three dimensional virtual space that is formed in a memory (not shown) in the battle controller 11 (not shown) according to the game program.

Figure 6:
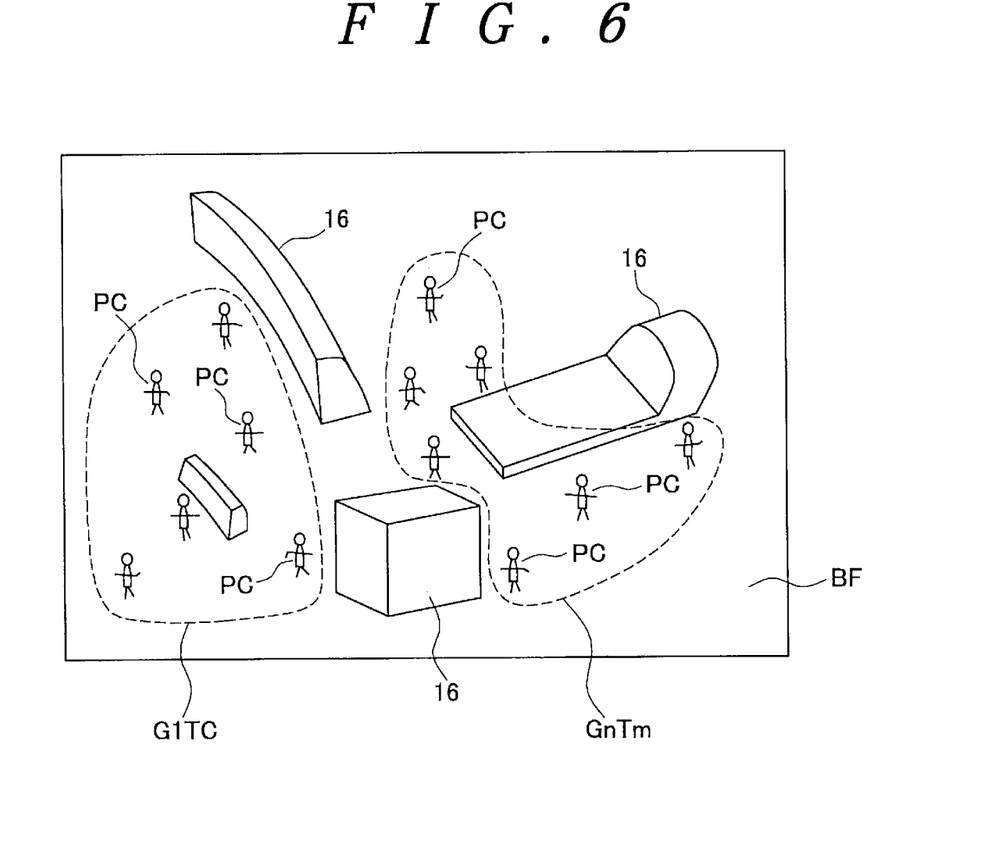
FIG. 6 is a typical view that shows an instance of a team competition in a battle space.

In the team competition, the battle controller 11 locates two sets of teams in the battle space BF within the three dimensional virtual space that is formed in a memory (not shown) in the battle controller 11 according to the game program as shown in FIG. 6 such that GnTm that is some team Tm (m:A, B, . . . J) in some group Gn (n:1, 2 . . . N) is opposed to the team of a different group (in case of FIG. 6, the team of the different group being Team C belonging to Group 1, that is, Team G1TC). It may be random which team of which group and which team of which group are located in the battle space BF for the competition, or such a location may be determined according to certain rules, such as lottery and a dice.

In the battle space BF, as shown in FIG. 6, shielding objects 16 are properly located and the objects of the playing characters PC of two or more players that comprise Team GnTm of each group are located at predetermined battle start positions according to the team competition control program TBC, and in such a state, the battle starts. This battle is executed by a well-known method, attacking the playing characters of the opponent team each other, and the battle controller 11 adds up damages the respective playing characters receive. When the received damages exceed a predetermined value, the playing character is judged to be defeated, and a predetermined battle point is given to the playing character of the attacking team. There are various methods of calculating the battle points that each playing character obtains or loses due to such damages at the time of the battle, any method can be adopted.

A state of the battle in the battle space BF is properly rendered by a virtual camera located at a proper position in such a space BF, and is displayed on a display of the terminal 5 of each player. Each player operates his/her playing character displayed on the display through a controller so as to control the playing character to be properly moved in the battle space BF for continuing the battle. It is not necessary that one team competes with another one team in the battle of the respective teams in the battle space BF, and two or more teams belonging to different groups may compete with one another. For instance, Team B and Team C of Group 1 and Team D and Team G of Group 6 may compete against one another, mixed in disorder in the same battle space BF. In another embodiment, two or more battle spaces BF are set in the memory of the battle controller 11, the teams belonging to the respectively different groups compete with one another in two or more battle spaces BF, the battle controller 11 controls to watch each battle state in each battle space BF, and the image of the battle space BF where the player who participates in the battle rendered by the virtual camera is individually displayed on the display of each terminal 5 of the player who participates in the battle. In such a case, the battle controller 11 may control to display only an image of the battle space BF in which the playing character PC of each player participates, or may control to also display the image of the battle space BF in which the playing character PC of the player does not participate, such as the image of another battle space BF where another team belonging to the group the same as the player participates in the battle in the form of a multi-screen, or may control to display the battle states of two or more battle spaces BF, switching them at regular intervals.

Figure 4:
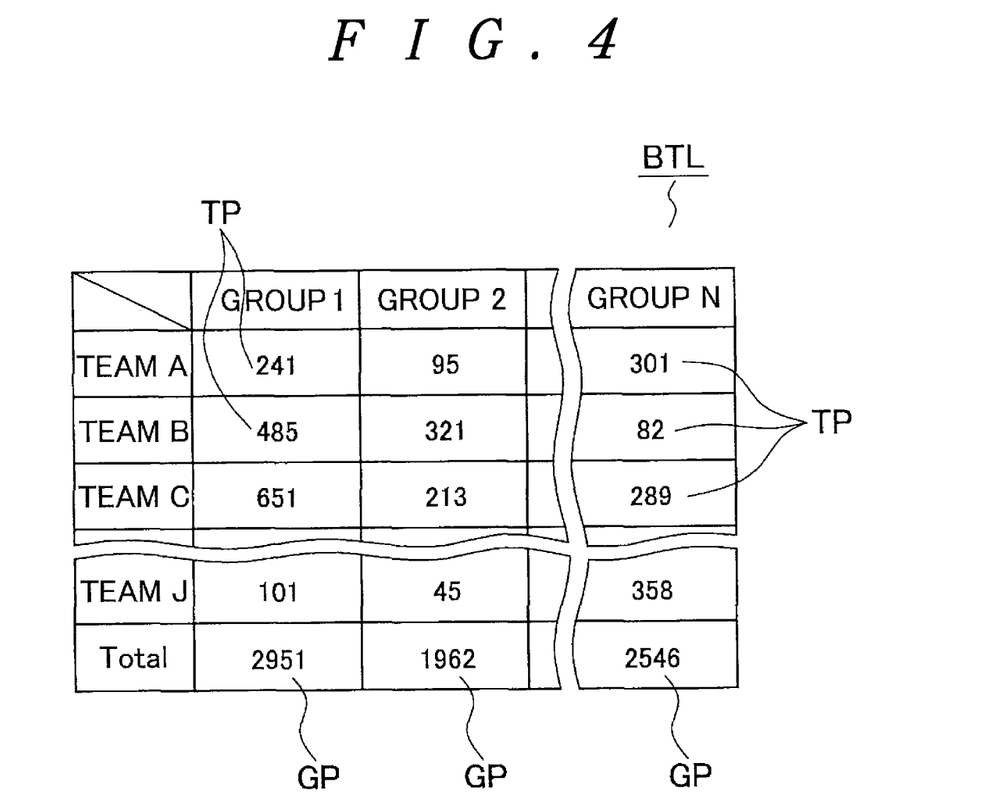
FIG. 4 is a view that shows an instance of a result summary table in battles for respective groups.

In Step S4 of the team competition control program TBC, the group result controller 15 always watches the battle state of each team in the battle space BF, and when each paying character PC in the battle space BF defeats the playing character of the opponent team in the battle, a predetermined battle point is real-timely added up as the team point TP of the team to which the playing character belongs, and such a point is stored in a result summary table BTL as shown in FIG. 4. An important point in such a case is that the battle point obtained when each playing character PC defeats the playing character PC of the opponent team in the battle is not collected for each playing character, but is collected for each team of the playing character PC as the team point TP. For this reason, the team points TP are collected for every team of each group at the point of the time, and in addition, the team points TP of all teams of the respective groups are collected and obtained as the group point GP in the result summary table BTL, as shown in FIG. 4.

Figure 5:
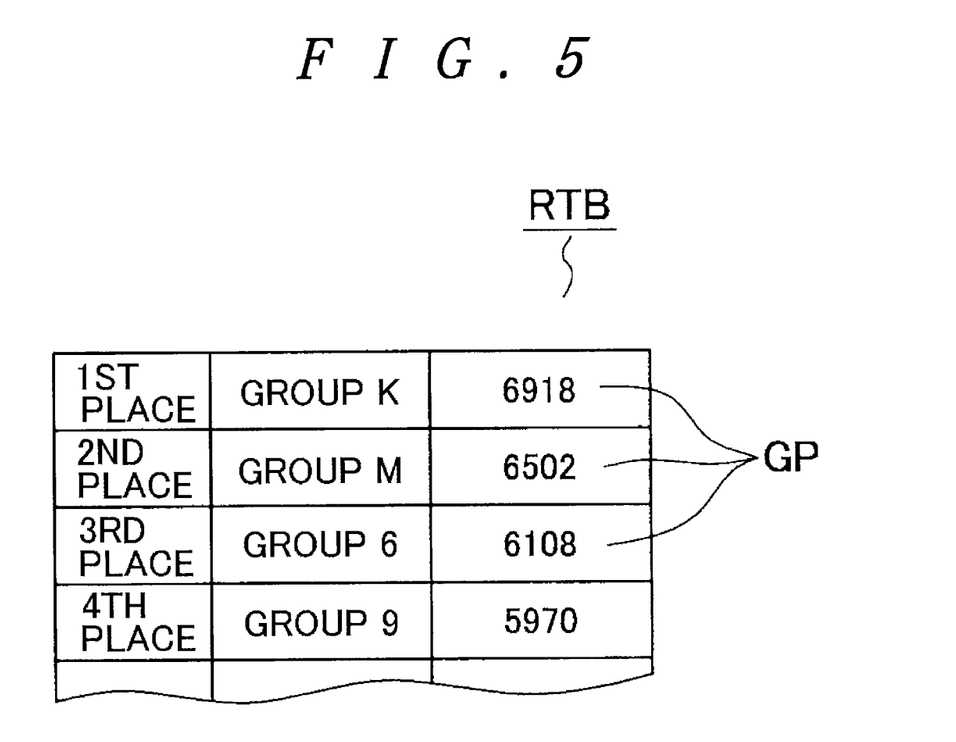
FIG. 5 is a view that shows an instance of a group ranking table.

The group result controller 15 enters Step S5, and for instance, the battle points are collected for all teams belonging to the respective groups as the team points TP every predetermined period, for instance, whenever the battle of each team ends in the battle space BF or whenever a predetermined time passes (several days through several years) in the game world so as to obtain the group points GP from the total of the team points, and a ranking table RTB showing such points GP is stored in the memory (not shown) as shown in FIG. 5. In the ranking table RTB, the respective groups are stored, being ranked by an order that there are many points GP at some point of time, such as a first place, a second place, a third place, . . . . Then, each player outputs the request to display the battle result to the server 2 through the terminal 5, so that the group result controller 15 outputs and displays the ranking of the respective groups at some point of time on the display of each terminal 5, referring to the ranking table RTB.

The battle results of the team competition are collected as the team point TP for each team of each group, and the ranking of each group is obtained for all teams belonging to each group for a predetermined period for each group, and the result is ranked every group. Therefore, the important point is how each group comprising the teams gets the team point TP, rather than the strength of each playing character, so that higher strategy and a close cooperation between the players are necessary, thereby widely increasing the interest of the game.

EXPLANATION OF REFERENCE NUMERALS 2 computer (game server)
5 terminal

BF battle space
PC playing character
TP team point of team

The invention claimed is:

1. A non-transitory computer-readable medium including a team playing type game program for causing terminals to execute routines in which playing characters respectively controlled by players battle each other in a three dimensional virtual space so as to obtain battle points, the obtained battle points being collected as total values, the total values being ranked, a player belonging to one of a plurality of groups set in the team playing type game program, the routines comprising:

a determining routine of determining whether a request has been made from the player to perform a team competition via a terminal of the player, the team competition being an event in which the playing characters respectively controlled by the players battle as teams and compete for superiority among the plurality of groups, to which each of the players belong, according to battle results;

a requesting routine of setting a plurality of teams for each group, and requesting each player who made the request to belong a playing character of the player to a team of a group to which the player belongs, when the determining routine determines that the request for the team competition has been made;

a team division routine of dividing the playing characters respectively controlled by the players, which have made the requests to perform the team competition through a network via the terminals, into specific teams based on input from each player, each specific team being in the group belonging to the player;

a storing routine of storing team data showing to which team each playing character belongs together with the belonging group in a memory;

a battle routine of battling for every team, including two or more playing characters comprising the team, between the teams of different groups in the three dimensional virtual space;

a point totalizing routine of totalizing the battle points obtained by the respective playing characters when executing the battle routine for every team, and storing the battle points as team points in the memory;

a group ranking routine of totalizing the team points every team obtained through the point totalizing routine for every group for a predetermined period, the team points being obtained for all teams belonging to the respective groups, and storing results in the memory, respectively giving a ranking for each group; and a ranking output routine of outputting the ranking for every group, wherein the respective groups obtain the team points, which are obtained through the point totalizing routine, rather than the playing characters.

2. The non-transitory computer-readable medium according to claim 1, the routines further comprising:

a routine of changing a team to which a playing character of a player belongs, and leaving the team to which the playing character belongs according to a team change instruction inputted by the player at an optional time via a terminal that the player operates.

3. The non-transitory computer-readable medium according to claim 1, wherein the battle routine, when starting, locates objects of the playing characters comprising the teams of the different groups in a battle space set in the three dimensional virtual space at predetermined battle start positions.

4. A game system in which playing characters respectively controlled by players battle each other in a three dimensional virtual space so as to obtain battle points, the obtained battle points being collected as total values, the total values being ranked, a player belonging to one of a plurality of groups, the game system comprising:
 a processor; and
 a memory including a game program that, when executed by the processor, causes the processor to execute routines, the routines including:
  determining whether a request has been made from the player to perform a team competition via a terminal of the player, the team competition being an event in which the playing characters respectively controlled by the players battle as teams and compete for superiority among the plurality of groups, to which each of the players belong, according to battle results;
  setting a plurality of teams for each group, and requesting each player who made the request to belong a playing character of the player to a team of a group to which the player belongs, when the determining routine determines that the request for the team competition has been made;
  dividing the playing characters respectively controlled by the players, which have made the requests to perform the team competition through a network via the terminals, into specific teams based on input from each player, each specific team being in the group belonging to the player;
  storing team data showing to which team each playing character belongs together with the belonging group in the memory;
  battling for every team, including two or more playing characters comprising the team, between the teams of different groups in the three dimensional virtual space;
  totalizing the battle points obtained by the respective playing characters when executing a battle for every team, and storing the battle points as team points in the memory;
  totalizing the team points every team obtained for every group for a predetermined period, the team points being obtained for all teams belonging to the respective groups, and storing results in the memory, respectively giving a ranking for each group; and
  outputting the ranking for every group,
 wherein the respective groups obtain the team points, which are obtained through the point totalizing routine, rather than the playing characters.

* * * * *